United States Patent
Vrzic et al.

(10) Patent No.: US 8,977,277 B2
(45) Date of Patent: Mar. 10, 2015

(54) METHOD AND SYSTEM FOR SPECTRUM SENSING AND LOW OVERHEAD FEEDBACK

(75) Inventors: Sophie Vrzic, Nepean (CA); Chandra Bontu, Nepean (CA); Shalini Suresh Periyalwar, Waterloo (CA); David G. Steer, Nepean (CA)

(73) Assignee: BlackBerry Limited, Waterloo (CA)

( * ) Notice: Subject to any disclaimer, the term of this patent is extended or adjusted under 35 U.S.C. 154(b) by 134 days.

(21) Appl. No.: 13/599,745

(22) Filed: Aug. 30, 2012

(65) Prior Publication Data

US 2013/0231124 A1    Sep. 5, 2013

(30) Foreign Application Priority Data

Aug. 31, 2011    (WO) ............... PCT/CA2011/000976

(51) Int. Cl.
*H04W 72/08*    (2009.01)
*H04B 17/00*    (2006.01)
*H04W 24/10*    (2009.01)

(52) U.S. Cl.
CPC .......... *H04W 72/08* (2013.01); *H04B 17/0077* (2013.01); *H04W 24/10* (2013.01)
USPC ....................................... 455/452.1; 370/229

(58) Field of Classification Search
CPC .... H04W 16/14; H04W 24/10; H04W 72/082
USPC ............. 455/423, 425, 450, 451, 452.1, 454, 455/452.2, 509, 513, 515; 370/252, 328, 370/329, 332, 341
See application file for complete search history.

(56) References Cited

U.S. PATENT DOCUMENTS

| | | | |
|---|---|---|---|
| 7,127,256 B2 | 10/2006 | Terry et al. | |
| 7,574,197 B1* | 8/2009 | Rebello | 455/410 |
| 7,986,673 B2 | 7/2011 | Khoshnevis et al. | |
| 8,068,459 B2* | 11/2011 | Kravtsov et al. | 370/329 |
| 2004/0266440 A1* | 12/2004 | Fuchs et al. | 455/445 |
| 2009/0245119 A1* | 10/2009 | Kuffner et al. | 370/252 |
| 2009/0247201 A1* | 10/2009 | Ye et al. | 455/509 |
| 2010/0034185 A1* | 2/2010 | De Bruin et al. | 370/342 |
| 2010/0202315 A1 | 8/2010 | Kwak | |
| 2011/0149942 A1* | 6/2011 | Ko et al. | 370/343 |
| 2012/0108276 A1* | 5/2012 | Lang et al. | 455/501 |
| 2012/0170546 A1* | 7/2012 | Binzel et al. | 370/331 |
| 2012/0320741 A1* | 12/2012 | Freda et al. | 370/229 |
| 2013/0201847 A1* | 8/2013 | Chincholi et al. | 370/252 |

OTHER PUBLICATIONS

PCT application No. PCT/CA2011/000976, International Search Report and Written Opinion of the International Searching Authority, mailed May 29, 2012.

* cited by examiner

*Primary Examiner* — Kashif Siddiqui
(74) *Attorney, Agent, or Firm* — Moffat & Co.

(57) ABSTRACT

A method at a network node for obtaining spectrum sensing information, the method communicating to at least one of a user equipment and a sensing node at least one event condition for spectrum sensing; providing to the at least one of the user equipment and the sensing node channel descriptors for reporting; and receiving a report from the at least one of the user equipment and the sensing node utilizing the channel descriptors, the report indicating the at least one event condition has been met.

26 Claims, 9 Drawing Sheets

METHOD AND SYSTEM FOR SPECTRUM SENSING AND LOW OVERHEAD FEEDBACK

RELATED APPLICATIONS

The present application claims priority to PCT Application Serial Number PCT/CA2011/000976, filed Aug. 31, 2011, the entire contents of which are incorporated herein by reference.

FIELD OF THE DISCLOSURE

The present disclosure relates to mobile networks and in particular to mobile networks capable of performing dynamic spectrum allocation.

BACKGROUND

In cognitive radio systems (CRS) or systems that can perform dynamic spectrum access (DSA), the spectrum is managed by dynamically allocating different bands to different network nodes based on demand. The network nodes may belong to one network operator or they may belong to different network operators. Spectrum sensing, done by UEs, network nodes such as evolved Node Bs (eNBs) or Relay Nodes (RN), or a dedicated sensing node, may be used to determine whether a channel is available or occupied. This sensing information can assist in the management and allocation of different bands to control interference among the nodes.

In one embodiment, this spectrum may be managed by a Spectrum Manager (SM), which may dynamically allocate channels to nodes based on sensing reports collected from various nodes or dedicated sensors. The Spectrum Manager may be an entity that belongs to one network operator, in which case, the Spectrum Manager is responsible for managing only the bands allocated to the network operator. Alternatively, the Spectrum Manager may be a shared entity that is responsible for managing spectrum among multiple network operators.

Sensing from multiple locations enables the Spectrum Manager to allocate the spectrum.

BRIEF DESCRIPTION OF THE DRAWINGS

The present disclosure will be better understood with reference to the drawings, in which.

DETAILED DESCRIPTION OF THE DRAWINGS

The present disclosure provides a method at a network node for obtaining spectrum sensing information, the method comprising: communicating to at least one of a user equipment and a sensing node at least one event condition for spectrum sensing; providing to the at least one of the user equipment and the sensing node channel descriptors for reporting; and receiving a report from the at least one of the user equipment and the sensing node utilizing the channel descriptors, the report indicating the at least one event condition has been met.

The present disclosure further provides a network node comprising: a processor; and a communications subsystem, wherein the network node is configured to communicate to at least one of a user equipment and a sensing node at least one event condition for spectrum sensing; provide to the at least one of the user equipment and the sensing node channel descriptors for reporting; and receive a report from the at least one of the user equipment and the sensing node utilizing the channel descriptors, the report indicating the at least one event condition has been met.

The present disclosure further provides a method at a spectrum manager comprising: communicating to at least one network node at least one event condition for spectrum sensing; and receiving a report from the at least one network node concerning event conditions being met.

The present disclosure further provides a spectrum manager comprising: a processor; and a communications subsystem, wherein the spectrum manager is configured to communicate to at least one network node at least one event condition for spectrum sensing; and receive a report from the at least one network node concerning event conditions being met.

The present disclosure further provides a method at a user equipment or a sensing node comprising: receiving both at least one event condition for spectrum sensing and channel descriptors for reporting; and sending a report to a serving network node utilizing the channel descriptors if the at least one event condition has been met.

The present disclosure further provides a processing apparatus comprising: a processor; and a communications subsystem, wherein the processing apparatus is configured to receive both at least one event condition for spectrum sensing and channel descriptors for reporting; and send a report to a serving network node utilizing the channel descriptors if the at least one event condition has been met.

Figure 1:
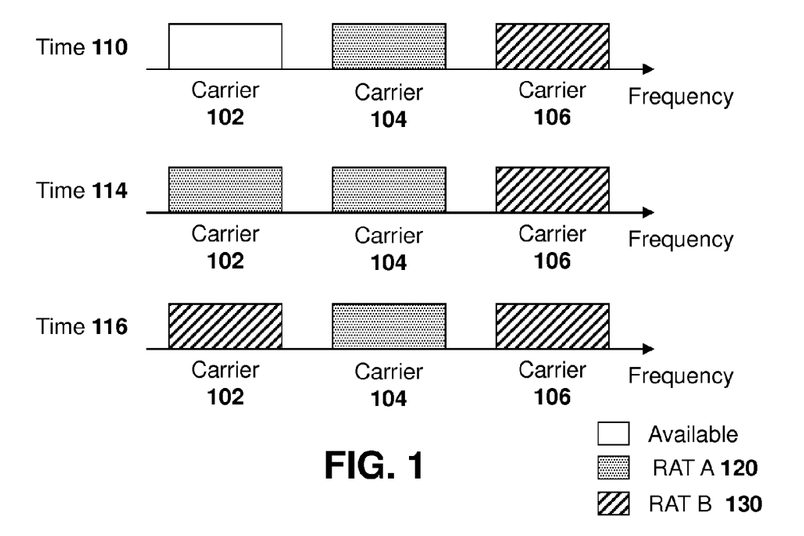
FIG. 1 is a diagram illustrating intra-operator allocation of resources at three separate times.

Reference is now made to FIG. 1. The figure shows the allocation of three carriers, namely carrier 102, 104 and carrier 106. The carriers may utilize any radio access technology and the present disclosure is not meant to be limited to any particular radio access technology.

As seen at time 110, carrier 102 is available while carrier 104 is allocated a first radio access technology 120 and carrier 106 is allocated a second radio access technology 130.

At time 114, the first radio access technology 120 requires more resources and therefore a Spectrum Manager may allocate carrier 102 for radio access technology 120. Carrier 104 still uses radio access technology 120 and carrier 106 still uses radio access technology 130.

At a time 116, the second radio access technology 130 requires more resources and therefore the Spectrum Manager allocates carrier 102 for radio access technology 130. Carrier 104 maintains the radio access technology 120 and carrier 106 is still allocated radio access technology 130.

Based on the above, carrier 102 may be allocated for different radio access technologies in a single operator scenario.

Figure 2:
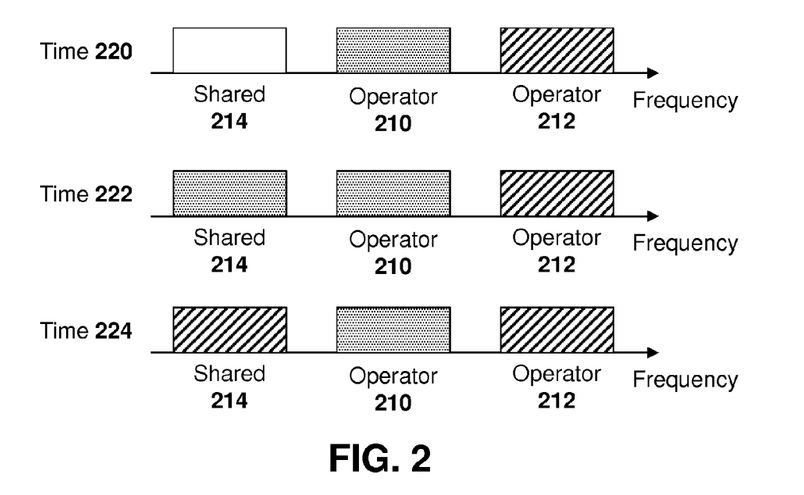
FIG. 2 is an inter-operator scenario in which various operators are allocated channels at three separate times.

Reference is now made to FIG. 2, which shows an inter-operator scenario. In the embodiment of FIG. 2 a first frequency 210 is allocated for operator A while a second frequency 212 is allocated for an operator B.

A third frequency 214 is a shared frequency for sharing between operator A and operator B. In a first time slot 220, the shared spectrum 214 is unallocated and available.

At a second time 222, operator A requires more resources and therefore the shared spectrum 214 is allocated to operator A.

Similarly, at a third time 224, operator B requires further resources and therefore the spectrum 214 is allocated to operator B.

In both of these FIG. 1 and FIG. 2 scenarios above, sensing information is required based on location. Since the bands can be reused by other nodes that are far enough away in distance from those that are using the band, sensing information is required in given geographic areas.

Figure 3:
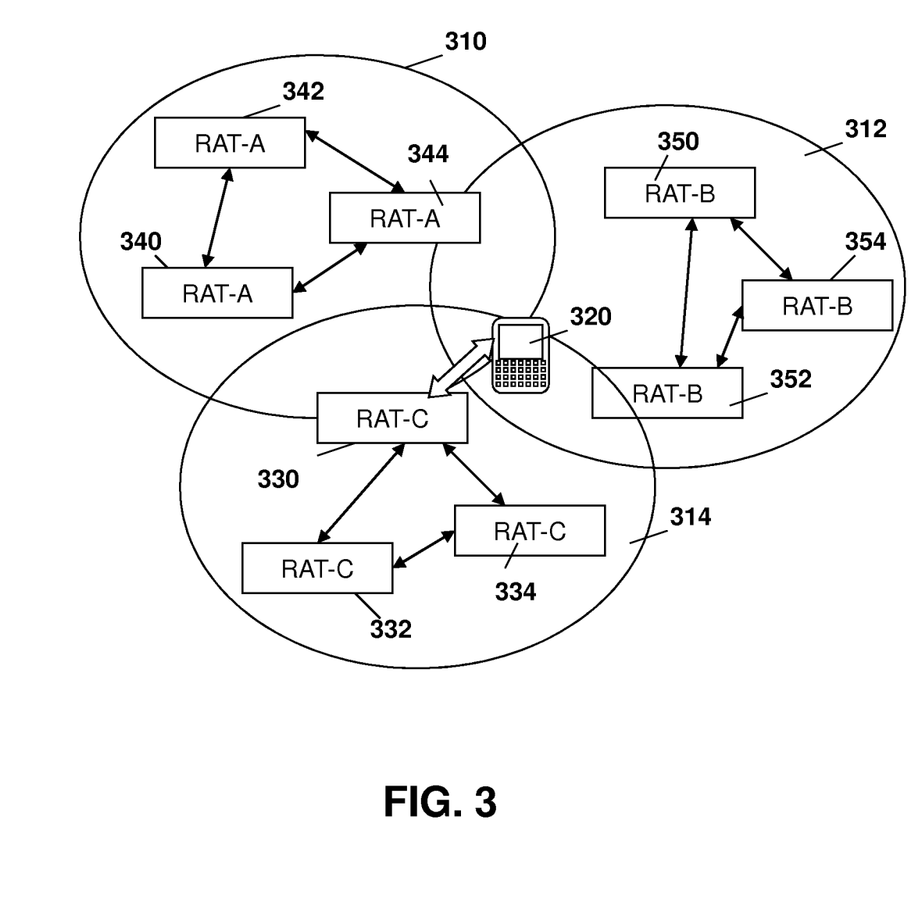
FIG. 3 is a block diagram showing an exemplary heterogeneous network having three radio access technologies.

Reference is now made to FIG. 3, which illustrates three different radio access technologies, 310, 312 and 314 respectively.

The three radio access technologies have some distant nodes that operate in the same frequency and neighbouring nodes from the different radio access technologies operating on different frequencies. In the example of FIG. 3, a UE 320 is served by nodes in radio access technology 314 and operating on the frequency of radio access technologies 314.

In the embodiment of FIG. 3, UE 320 may sense other channels and report back the channel availability to its serving node.

Thus, in the embodiment of FIG. 3, UE 320 communicates with node 330 which is the serving node. The serving node also is in communication with other nodes within the same radio access technology 314. Specifically, node 330 communicates with nodes 332 and 334.

In radio access technology 310, nodes 340, 342 and 344 operate and communicate among each other.

Similarly, in radio access technology 312, nodes 350, 352 and 354 operate and communicate among each other.

For resource allocation, a UE may need to provide a sensing report indicating used and free channels, as seen by the UE. However, if each UE and sensor node is allocated a separate uplink channel for providing the sensing report for multiple channels, the sensing reporting overhead may be high.

In order to minimize sensing reporting overhead, the present disclosure provides a new uplink sensing feedback report channel and method. The channel minimizes uplink signaling overhead and also reduces signalling overhead in the downlink, which is used to configure sensors. The approach provides for enough flexibility for deciding what sensing information is sent and which sensors report the information.

Thus, in accordance with one embodiment of the present disclosure, a low overhead sensing feedback channel and flexible sensing control method for reconfiguring the type of sensing information that is collected based on demand are provided.

The present disclosure, in one embodiment, addresses the issue of dynamic allocation of radio access technology (RAT) specific channels within available spectrum to the network nodes such that inter-cell interference is controlled to a desired level. More specifically, the present disclosure, in one embodiment, addresses the problem of UEs or dedicated sensor nodes providing low overhead sensing reports to a serving network node or a spectrum management node. The type of sensing and the UEs or dedicated sensors which send the sensing reports are configured by the network nodes and by an operator controlled Spectrum Manager.

Thus, in accordance with one embodiment of the present disclosure, a radio access technology specific uplink sensing feedback channel (UL SFCH) is configured by network nodes. The information sent over the UL SFCH may consist of a collection of statistics from different sensors. For example, the information can be used by the serving eNB for the purpose of managing over-the-air resources or it can be forwarded to a Spectrum Manager which can collect sensing information from multiple network nodes. In the latter case, the spectrum management node can provide a spectrum usage map from the combined sensing information.

Figure 4:
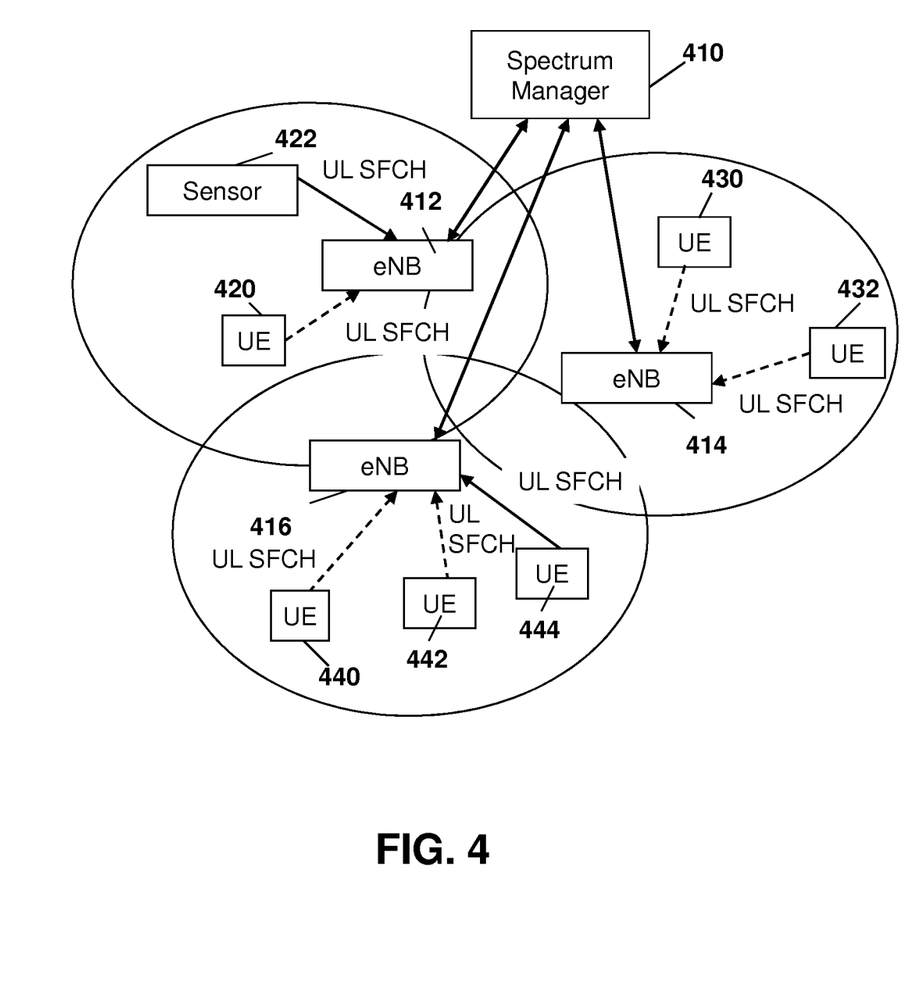
FIG. 4 is a block diagram showing an exemplary heterogeneous network utilizing a spectrum manager.

Reference is now made to FIG. 4. In FIG. 4 a Spectrum Manager 410 is configured to dynamically assign the radio access technology specific channels from available spectrum across the network nodes such that inter-cell interference is minimized to a level that is acceptable for the network and available spectrum utilization may be maximized. To do this effectively, the Spectrum Manager 410 makes use of updated spectrum utilization information from network nodes 412, 414 and 416.

Network nodes 412, 414 and 416 may obtain interference levels or other sensed information observed at geographical locations within the node's coverage area by requesting sensing reports from served UEs or from dedicated sensors. Thus, as shown in FIG. 4, a UE 420 is served by eNB 412 and can provide sensing information. Similarly, a sensor 422 may also provide this information to eNB 412.

For eNB 414, UEs 430 and 432 are shown. Similarly, for eNB 416, UEs 440, 442 and 444 are shown.

An uplink sensing feedback channel is assigned by the network nodes 412, 414 and 416 so that the measured sensing information may be sent by the UEs or dedicated sensors whenever sensing information is requested.

The serving node may indicate the event to be measured in a broadcast message. The serving network nodes may use a multi-cast or broadcast channel to inform UEs or dedicated sensors of the uplink sensing feedback channel descriptor and associated event triggers for collecting and reporting the statistics, as provided below. For example, in 3GPP long term evolution (LTE) the broadcast/multicast message may include a resource map, sub-frame code to use among other as the UL SFCH descriptor.

All sensing nodes that can correctly decode the broadcast message of the serving node may check if any of the defined event triggers have occurred. For example, an event may be defined as a condition where the interference level measured at a sensing node on a specified channel is above a given threshold. If an event occurs then the sensing node may inform the network nodes using the UL SFCH. The serving node may indicate the event to be measured in a broadcast or a multicast message. It may also include timing intervals during which the UE should perform these measurements. These measurement intervals may be coordinated across the network to enable coordinated localized sensing gaps.

In order to ensure that only authorized mobile devices or dedicated sensors provide sensing feedback using the UL SFCH, broadcast/multicast messages indicating events and a corresponding UL SFCH descriptors can be encrypted at the serving node in one embodiment. The encryption key may be provided to authenticated mobile user equipments or dedicated sensors. The encryption key may also be updated periodically in one embodiment.

Sensors and UEs that are unable to decode the broadcast/multicast information would be unable to access the UL SFCH.

As will be appreciated by those in the art, a UE may be considered to be in an idle mode or a connected mode. If in a connected mode, the UE has an active traffic channel between the eNB and the UE and can receive dedicated signaling messages. However, the present disclosure provides for the sending of uplink SFCH descriptors and corresponding events to UEs in idle mode. Thus, if there are not a sufficient number of active UEs within the location specified for sensing feedback or for additional feedback statistics which may be required to improve the confidence of the sensing information, the network nodes may also inform the UEs in idle mode to perform sensing measurement. While such sensing may be instructed by network nodes, in one embodiment network nodes may restrict the use of idle mode UEs to conserve the UE battery power.

The use of an event based trigger for sensing feedback may reduce the sensing feedback traffic from all sensors in the network. The event triggered spectrum sensing method of the present disclosure limits the feedback traffic to only the appropriate sensors. For example, if the channel availability information is required for a specific geographic location then the event trigger for the sensing feedback can include the maximum distance to an intended location as well as a threshold for the received power on the indicated channel. The UE or dedicated sensor that is close to the specified location (within the specified maximum distance) may send sensing information to the serving node for that UE or dedicated sensor. The sensing information may indicate whether the interference measured over the specified band is above the specified threshold or not.

In the case where a UE or dedicated sensor moves to a new serving cell before reporting or completing the sensing measurements within its old serving cell, the UE may, in one embodiment, continue the sensing measurements and report to the new serving cell if the same events are configured by the new serving cell. The measurements may be reported to the new serving cell using the new serving cell's UL SFCH configuration. If the new serving cell does not broadcast/multicast the same events, the UE may discontinue the sensing measurements and reports.

Once sensing information is collected, where the information has a quality exceeding a quality metric, defined by the Spectrum Manager, the serving nodes may end the broadcast/multicast of the event triggers for the UEs or the dedicated sensors to stop the sensing reports. Thus, a UE will monitor the broadcast/multicast channel and once the event triggers are no longer broadcast, or if the event triggers change, the UE will update its sensing procedures appropriately.

The ending of the broadcast messages indicating the sensing events may be triggered by the SM 410. The UEs may be instructed to report the sensing measurement only once per advertised event. In some embodiments this allows the serving cell to continue broadcasting/multicasting the event triggers to obtain more sensing feedback statistics from other UEs or dedicated sensors without obtaining repeated feedback from the same UE or dedicated sensor.

As shown in FIG. 4, the sensing nodes include sensors 422 and UEs 420, 430, 432, 440, 442, and 444 make measurement as indicated by events defined by the serving node. The measurements may be RAT specific and event specific. When an event occurs, the sensing node sends an event indicator on the UL SFCH to the serving node.

In one embodiment, the serving node may forward the raw data to the SM. In another embodiment, the serving node collects the sensing feedback from all sensors and forwards the information to the Spectrum Manager. The collection and forwarding may be in real time or may be accumulated over a specified time period and forwarded. In one embodiment, the feedback is provided by way of a consolidated report rather than raw data. For example, a histogram might be provided regarding spectrum usage.

The information is forwarded from the serving nodes to the Spectrum Manager 410, which can then determine a spectrum usage map based on location information. The map may be used by the Spectrum Manager 410 when allocating available channels to the requested network nodes. The Spectrum Manager 410 may also provide the spectrum usage map to network nodes where it may be used, for example, for local channel allocation procedures.

Dynamic Spectrum Access

One scenario where the UL SFCH may be used is for dynamic spectrum access (DSA). In DSA, a request may be made, for example, by a UE for device to device communication. The requesting UE and the nearby UEs can sense a set of channels and report the results to the serving node. However, since UEs in other cells may also be near the UE requesting the channel, UEs in neighbouring cells may also sense the channels in one embodiment and provide reports to their serving node.

Figure 5:
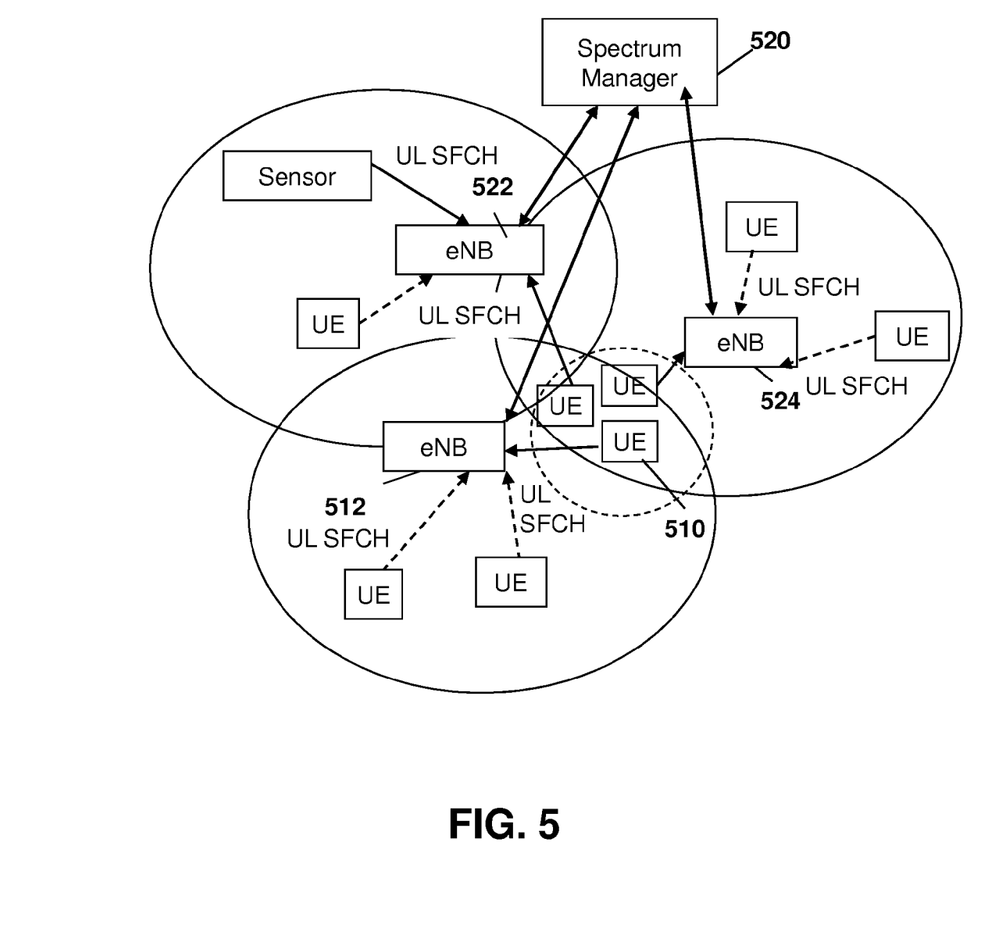
FIG. 5 is a block diagram showing an exemplary heterogeneous network in which a UE initiates a device to device communication.

Reference is now made to FIG. 5, which illustrates an exemplary scenario where a UE 510 is served by serving node 512. UE 510 sends an uplink request to serving mode 512 for a device-to-device (D2D) communication.

If spectrum is not available for this request, serving node 512 may send a request to Spectrum Manager 520 for an additional frequency band. The SM 520 further requests all neighbouring nodes, including node 522 and node 524, to initiate a spectrum sensing event broadcast/multicast. This request may include, but is not limited to, various parameters such as:

The location of the UE that made the request for D2D;

The frequency band over which the sensing has to be performed;

The criteria for sensing, such as or example interference level; and

The frequency resolution, $\Delta f$, for sensing.

The timing intervals for sensing opportunities for different locations

All UEs within the vicinity of the requested UE may perform sensing of the specified frequency band and send the information back to their serving nodes. Thus, all UEs that satisfy a distance criteria may send a report back. The distance criterion may be calculated by each UE at a location (x, y, z) as:

$$D=\sqrt{(x-x_0)^2+(y-y_0)^2+(z-z_0)^2} \leq D_{max} \quad (1)$$

where $(x_0, y_0, z_0)$ is the location of the UE that sent the uplink request for D2D.

In the above example, the serving eNB and the neighbouring eNBs may broadcast the following events.

EV1: $d_i < D_{max}$ and $I_1 > I_{max}$

EV2: $d_i < D_{max}$ and $I_2 > I_{max}$

EV3: $d_i < D_{max}$ and $I_3 > I_{max}$

EV4: $d_i < D_{max}$ and $I_4 > I_{max}$

Where the parameters are as follows:
$d_i$ UE distance to location i (specified in the broadcast message of the serving node)
$D_{max}$ Maximum distance threshold,
$I_j$ Interference on channel j,
$I_{max}$ Maximum interference power The condition $d_i<D_{max}$ is used to restrict the collection of the sensing measurements to UEs that are near the location of the originating request. The second condition of $I_j>I_{max}$ is used to determine whether or not channel j is available. Each of the events is mapped to a unique spreading code or sequence.

In an alternative embodiment, the event triggers that are broadcast/multicast may be more generally specified by indicating the frequency range and spacing for the sensing operation and a mapping for a channel availability vector to a spreading code to be used on the UL SFCH to report on the event. In accordance with this embodiment, the UE can determine the vector $A^{(j)}=(I_1^j, I_2^j, \ldots, I_{n_c}^j)$ which represents the channel availability for the $n_c$ channels defined by the range $[f_1, f_2]$ and frequency spacing $\Delta f$. The UE can then determine its distance $d_i$, to the specified reference point i. If the UE satisfies the distance criterion, the UE can then determine the sequence to send on the UL SFCH. This sequence can be represented as the vector $\Psi^{(j)}=A^{(j)}$, where $j=1, \ldots, n_s$. The parameter $n_s$ is the number of possible vectors $A^{(j)}$. If the channel availability vector consists of binary values indicating either available or occupied then the number of combinations for the availability vector is $n_s=2^{n_c}$.

In another alternative embodiment, different events may be distinguished by orthogonal UL SFCH allocation.

After reading the broadcast channel that defines the events, the UEs make measurements according to the defined events. Once the measurements are made, the UEs may send a corresponding sequence on the UL SFCH for each of the events that have occurred. The network node receiving the uplink SFCH collects the sensing feedback from all sensors and can use the collected information to determine which channels are available for allocation and/or the network node can forward the sensing information to a Spectrum Manager, which can make the decision on channel availability.

In a further embodiment, event triggers can be designed to provide information to the Spectrum Manager regarding the quality of the sensing feedback.

To evaluate the quality of sensing feedback information, the SM 520 may perform the following.

In a first step, the sensing UE may scale the transmit power level of its UL SFCH report based on its distance from the location indicated in the event $D=\sqrt{(x-x_0)^2+(y-y_0)^2+(z-z_0)^2}$. To indicate the quality of the sensing feedback, the UE/sensor may use a different target receive Signal to Interference Notice Ratio (SINR) or different receive power level at the eNB to determine its transmit power level. Alternatively, sub-events can be defined based on the proximity by defining N different levels of $D_{max}$; $D_{max}^0, D_{max}^1, \ldots, D_{max}^{N-1}$, where $D_{max}^0 \leq D_{max}^1 \ldots \leq D_{max}^{N-1}$. Based on the level of its proximity, a different code may be used by the UE/sensor to send the sensing feedback.

In a second step, the network node receiving the UL SFCH may scale the collected sensing reports based on signal strength of the UL SFCH. Alternatively, the network node may report the signal strength of the sensing report back to SM 520.

SM 520 may also scale the reported results from different network nodes. For example, if one reported result is based on feedback from 100 UEs, while a second is based on feedback from 5 UEs, the report based on the 100 UEs may be scaled higher to show increased confidence in the report.

If the received spectrum sensing feedback from the multiple network nodes is within a predefined confidence interval and provides a sufficiently accurate picture of spectrum usage, the SM 520 may instruct network nodes to end the reporting by the UEs or dedicated sensors. This may be done, for example, by ending the broadcasting/multicasting of the sensing event triggers.

The UEs may be requested to report the sensing event only once per broadcast of events or may be requested to periodically measure and report sensing feedback. In the case where the UEs are only requested to send the feedback once, the broadcast of the events may be stopped when enough UEs have reported the sensing information. This will prevent new UEs from measuring and reporting when information is no longer needed, thereby potentially saving network resources and avoiding unnecessary battery drain on the UEs.

Sensing Feedback for Obtaining a Wide Area Spectrum Usage Map

Sensing report information may also be collected for the purpose of obtaining a wide area map of spectrum availability. In this example, network nodes may broadcast/multicast signalling for events to be measured by various UEs or sensors and it may broadcast/multicast timing intervals during which the UE/sensors perform the sensing measurements. Exemplary events are described below.

EV1: $d_1<D_{max}$ and $I_1>I_{max}$
EV2: $d_2<D_{max}$ and $I_1>I_{max}$
EV3: $d_3<D_{max}$ and $I_1>I_{max}$
EV4: $d_4<D_{max}$ and $I_1>I_{max}$ In the exemplary events above, the first condition in each event identifies the UE's location or region within a cell. For example, the UE can measure its distance from a reference point and can select the event which corresponds to the closest reference point.

The second condition in each event above indicates whether or not the indicated channel is available. Here, availability may mean that the sensed signal strength is below a threshold $I_{max}$.

If a one or more of the events are satisfied, then the UE indicates the event that was triggered by transmitting a sequence on the UL SFCH.

Alternatively, the UE may send a sequence that corresponds to an n bit message that represents the UE's location and a bit map representing channel availability for channels indicated in the broadcast message of the serving node. For example, if there are 1,024 sequences then a 10 bit message can be conveyed to the serving node. The first k bits may represent the UE's location or region within the cell and the remaining bits can represent the channel availability bit map where the bit map corresponds to the channels indicated in the broadcast message.

In general, the UE can determine the vector $A^{(j)}=(I_1^j, I_2^j, \ldots, I_{n_c}^j)$ which represents the channel availability for the $n_c$ channels defined by the range $[f_1, f_2]$ and frequency spacing $\Delta f$. The UE can then determine its location $L_i$, which may be the nearest reference point i. By combining the location information and the channel availability vector, the UE can determine the sequence to send on the UL SFCH. This sequence can be represented as the vector $\Psi^{(k)}=(L_i, A^{(j)})$, where $k=i+n_l j, i=1,\ldots,n_l, j=1,\ldots,n_s$. The parameter $n_l$ is the number of reference points and $n_s$ is the number of possible vectors $A^{(j)}$. If the channel availability vector consists of binary values indicating either available or occupied then the number of combinations for the availability vector is $n_s=2^{n_c}$.

Functionality of the Spectrum Manager

Systems that involve dynamic spectrum access such as cognitive radio systems can use an entity, referred to herein as a spectrum manager, to efficiently manage available spectrum. Such a spectrum manager is represented, for example, in FIG. 4 by spectrum manager 410 and FIG. 5 by spectrum manager 520.

The spectrum manager may be an entity owned by one operator for use in allocating available spectrum within the operator's own licensed bands. Alternatively, the spectrum manager may be a shared entity owned by multiple operators that is responsible for allocating available spectrum within bands shared by the operators. In either case, the spectrum manager may use sensing information measured and reported by UEs or dedicated sensing nodes at various locations. The sensing information can be collected and processed by the spectrum manager and stored in a geo-location database containing information such as the frequency bands, the radio access technologies used within the bands, the maximum transmit power allowed, among other factors. The database can then be used to optimally allocate available spectrum for various nodes throughout the network.

The spectrum manager may request sensing feedback from specific network nodes based on demand. For example, a frequency band may be allocated to a network node using one radio access technology. When that band or channels within the band are idle then they may be used by other nearby nodes. In this case, the nearby nodes can sense the channel to determine if it can be used dynamically. The nearby nodes may also inform the spectrum manager of the channels that they will use. This information can be sent to the network node so that the network node may avoid dynamic users if possible. The approach can be used in shared spectrum where there may be multiple dynamic users.

In a further scenario, the spectrum manager may allocate a different frequency band to a set of neighboring nodes. This set of nodes can share the band through the use of spectrum sensing. A portion of the band may also be allocated for a specific application such as a device-to-device communication. In this case, specific sensing events can be constructed to optimize the sensing for that band.

The sensing information can include the type of signal to sense such as the radio access technology used in the band, the range of the band and frequency spacing. Sensing events can be specific to the location of the device sending the request. The SM may coordinate the timing intervals across the network for sensing based on UE/sensor node location. This information may be sent to the appropriate network nodes to be included into the event broadcast/multicast message.

Figure 6:
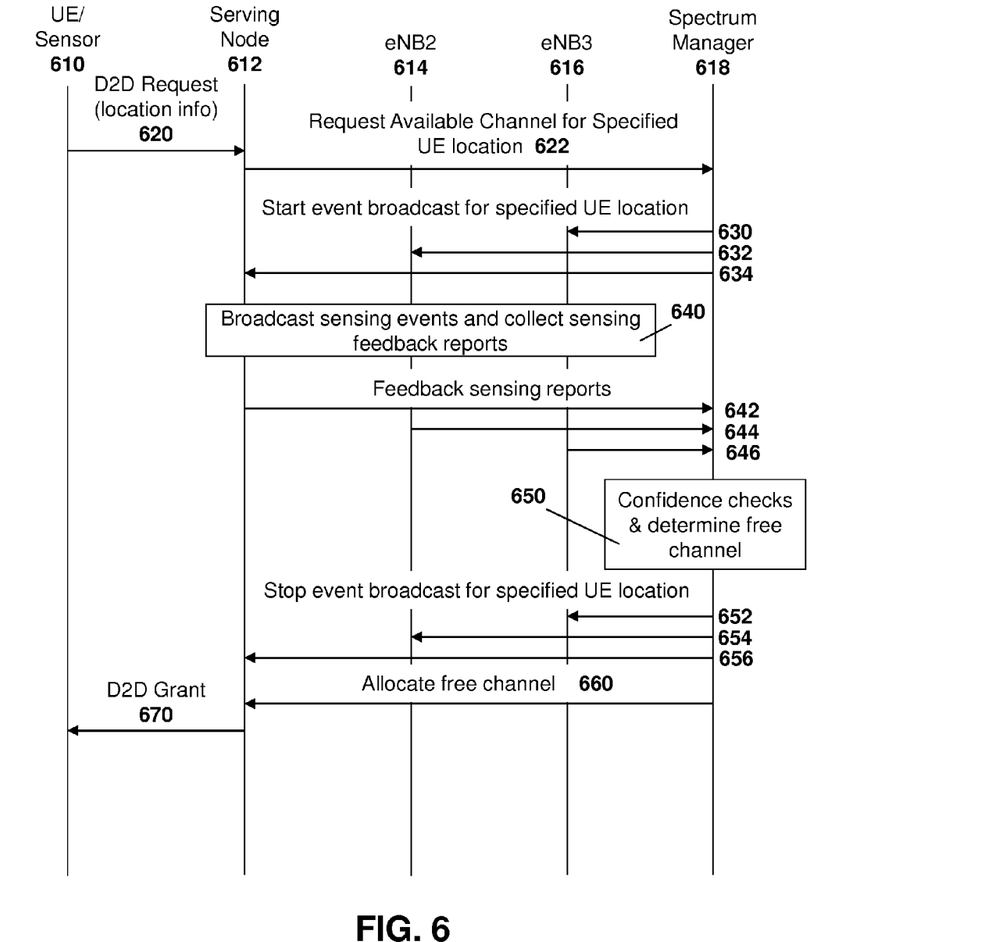
FIG. 6 is a flow diagram showing communication between a UE, network nodes and a spectrum manager.

Reference is now made to FIG. 6. In a device-to-device example where a UE sends a request to its serving network node for device-to-device communication, FIG. 6 illustrates steps for the spectrum manager in the network nodes. In particular, UE/dedicated sensor node 610 communicates with a serving network node/eNB 612.

A spectrum manager 618 allocates the spectrum for network nodes 612, 614 and 616.

As seen in FIG. 6, the UE 610 may send a request for a device-to-device communication to its serving node, as shown by arrow 620. The request at arrow 620 may include, in one embodiment, the UE's own location and the target UE's location.

In response to the request at arrow 620, serving node 612 may not have sufficient resources such as a channel to allocate to the UE. The serving node 612 may thus send a request to the spectrum manager 618 for additional bandwidth. This request is shown by arrow 622. In one embodiment, the request may include the location of the UE requesting the resources.

In response to receipt of the request at arrow 622, spectrum manager 618 may send a message to the serving node and neighboring nodes 614 and 616 specifying the event conditions to broadcast for requesting sensing feedback information from nearby UEs and/or sensing nodes. These requests are shown by arrow 630, 632 and 634.

Each of the nodes 612, 614 and 616 then broadcast the sensing events and collect sensing feedback reports from the UEs or sensing nodes, as shown by block 640. The nodes each have their own uplink SFCH configuration which is broadcast/multicast along with the sensing event.

Once the feedback reports have been collected eNBs may forward those reports to the spectrum manager 618 as shown by arrows 642, 644 and 646. As will be appreciated, these sensing feedback reports may be sent after a predetermined time period has expired or after a certain number of feedback reports have been received by the network node in some embodiments.

The spectrum manager 618 may then perform a confidence check on each of the sensing reports received at arrows 642, 644 and 646 to determine free channels and to select a free channel for the UE's request and notify the UE's serving node that sent the request. Specifically, as shown by block 650, the confidence check is done and free channels are determined based on the confidence level in the feedback reports.

The spectrum manager 618 then sends a stop event broadcast for the specified UE location as shown by arrows 652, 654 and 656.

The spectrum manager 618 further allocates a free channel, as shown by arrow 660 and this allocation is sent to serving network node 612.

As a result of the receipt of the allocation of the free channel, network node 612 provides a device-to-device grant, as shown by arrow 670, to UE 610.

The spectrum manager 618 may further update a geo-location database with sensed information and the new channel allocation.

The event descriptors that are sent to the serving node and neighboring nodes may contain a frequency range and spacing for sensing. For example, in order to reduce the amount of time the UEs or sensors spend sensing, the spectrum manager can allocate a starting frequency, $f_1$, and end frequency, $f_2$ and a frequency spacing $\Delta f$. The UL SFCH in this case can obtain a k-bit message that indicates which of the k channels are available. The total number of possible combinations and thus events is therefore $2^k$.

Sensing Feedback Channel Structure

The number of UEs or sensors in a cell might be large. In this regard, the uplink SFCH may use minimal resources in order to keep feedback overhead low. One way to reduce the amount of uplink resources is to use the same set of resources for uplink SFCH from all UEs that belong to a given cell.

In this approach, sensing feedback corresponds to one of several possible events. Each event is associated with a unique spreading code. The spreading code is used by all the UEs that satisfy the event and is transmitted on the resources allocated for the UL SFCH. The node receiving the UL SFCH de-spreads each spreading code. If the UE has the same target received SINR for the UL SFCH, the receiving node can then determine the number of UEs that satisfy each of the events. This may be done by determining the total power received from multiple reporting UEs.

The UL SFCH channel from neighboring network nodes should, in one embodiment, not use the same codes or resources. The set of codes used and/or resources used for the UL SFCH may be node specific.

Both active and idle mode UEs may be allowed to transmit on the UL SFCH. If only active UEs are used then the amount of resource used for the UL SFCH may be smaller since active UEs are synchronized with the serving node. Conversely, if idle mode UEs, which are not synchronized with the serving node, are allowed to transmit on the UL SFCH then a sufficient guard time must be added to account for different arrival times of OFDM symbols from the idle mode UEs. This may increase the amount of resources required for the UL SFCH, but it has the benefit of collecting additional statistics from idle UEs.

The UL SFCH may be power controlled by the serving node so that the received target SINR is the same for each UE for each event. In an alternative embodiment, a different target SINR can be used to indicate the quality of the sensing measurement report.

Figure 7:
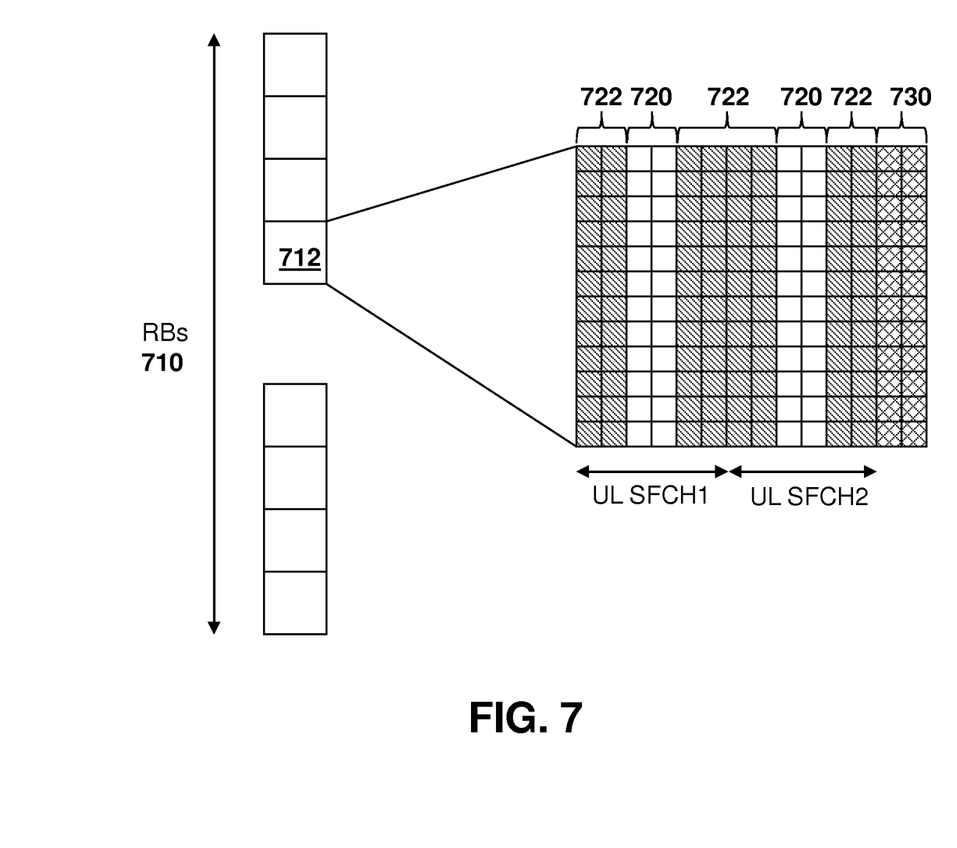
FIG. 7 is a block diagram of a resource block showing communication of an uplink sensing feedback channel for unsynchronized communications.

The UL sensing feedback channel structure for an unsynchronized case is illustrated with regard to FIG. 7. In particular, in FIG. 7 resource blocks 710 are shown and resource block 712 is expanded.

In the expansion of resource block 712, OFDM symbols for uplink SFCH 720 are surrounded by guard symbols 722.

Further, OFDM symbols 730 may be used for other purposes or not used at all.

Figure 8:
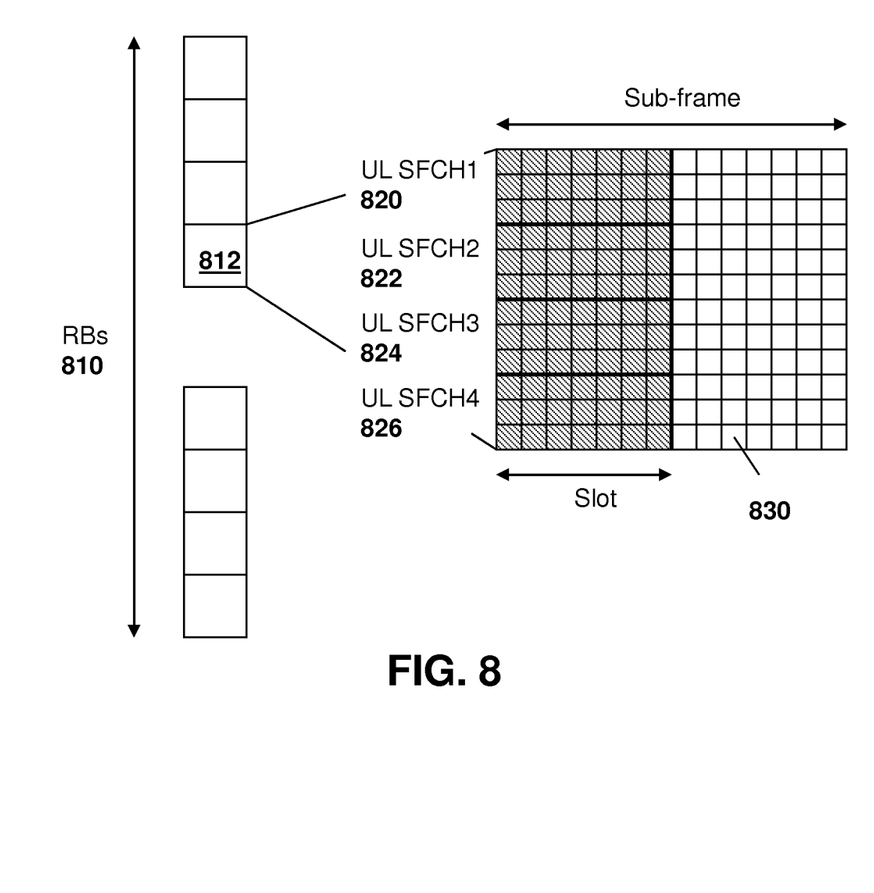
FIG. 8 is a block diagram of a resource block showing communication of an uplink sensing feedback channel for synchronized communications.

Reference is now made to FIG. 8 which shows the UL SFCH structure in the case where UEs are uplink synchronized with the serving node. In this case, resource blocks 810 are shown and resource block 812 is expanded. In this case, UL SFCH1 is shown for OFDM symbols 820, UL SFCH2 is shown for symbols 822, UL SFCH3 is shown for symbols 824 and UL SFCH4 is shown for symbols 826.

OFDM symbols shown by reference number 830 are either not used or used for other purposes.

The examples of FIGS. 7 and 8 assume that Orthogonal Frequency-Division Multiple Access (OFDMA) is used. However, a similar approach may be used in other systems, such as, TDMA or CDMA.

The UL SFCH can be decoded either using coherent detection or non-coherent detection. In the case of non-coherent detection, more spreading codes may be needed in order to differentiate the different UEs or dedicated sensors.

Further, the number of resource blocks used for UL SFCH may be configurable. The length of the spreading sequence may depend on the number of events configured for UL SFCH.

Event configuration for the corresponding node is indicated to the UEs. This information can be included in a broadcast/multicast message. For example, a radio frame number x, and a sub-frame number y, defines the resources for uplink sensing feedback channel for each node. Specific RBs and OFDM symbols within the subframe may also be advertised.

Each node may broadcast its own sensing feedback channel configuration. A node may have multiple UL SFCH channels for collecting different types of sensing information.

In order to improve the reliability of the UL SFCH, the UEs may send the spreading sequence multiple times over multiple blocks of contiguous sub-carriers. The multiple blocks can span over frequency or time.

The above may be implemented by any network element. A simplified network element is shown with regard to FIG. 9. The network element of FIG. 9 could represent any network node, serving node or spectrum manager.

Figure 9:
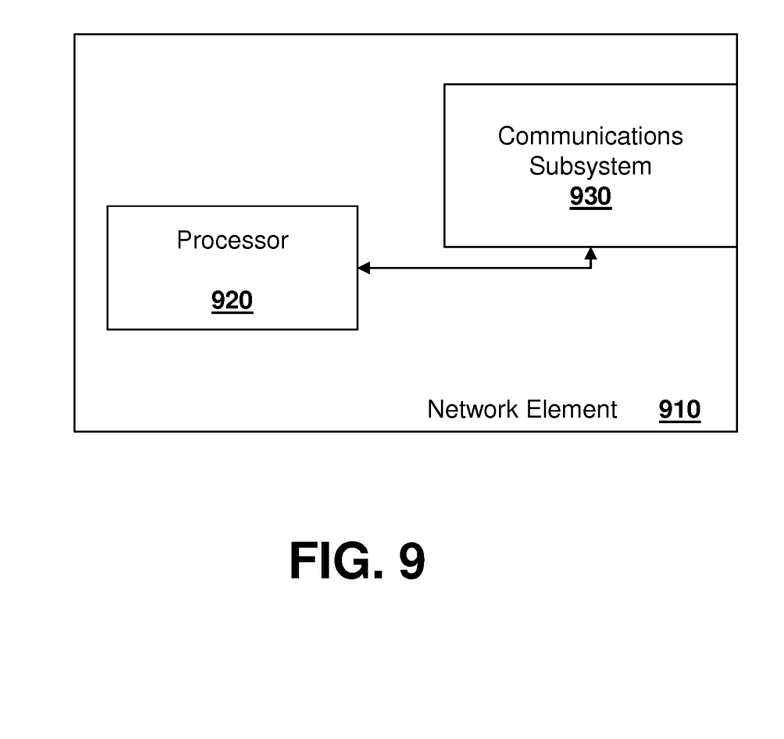
FIG. 9 is a simplified block diagram of an exemplary network node.

In FIG. 9, network element 910 includes a processor 920 and a communications subsystem 930, where the processor 920 and communications subsystem 930 cooperate to perform the methods described above.

Further, the above may be implemented by any UE. One exemplary device is described below with regard to FIG. 10.

Figure 10:
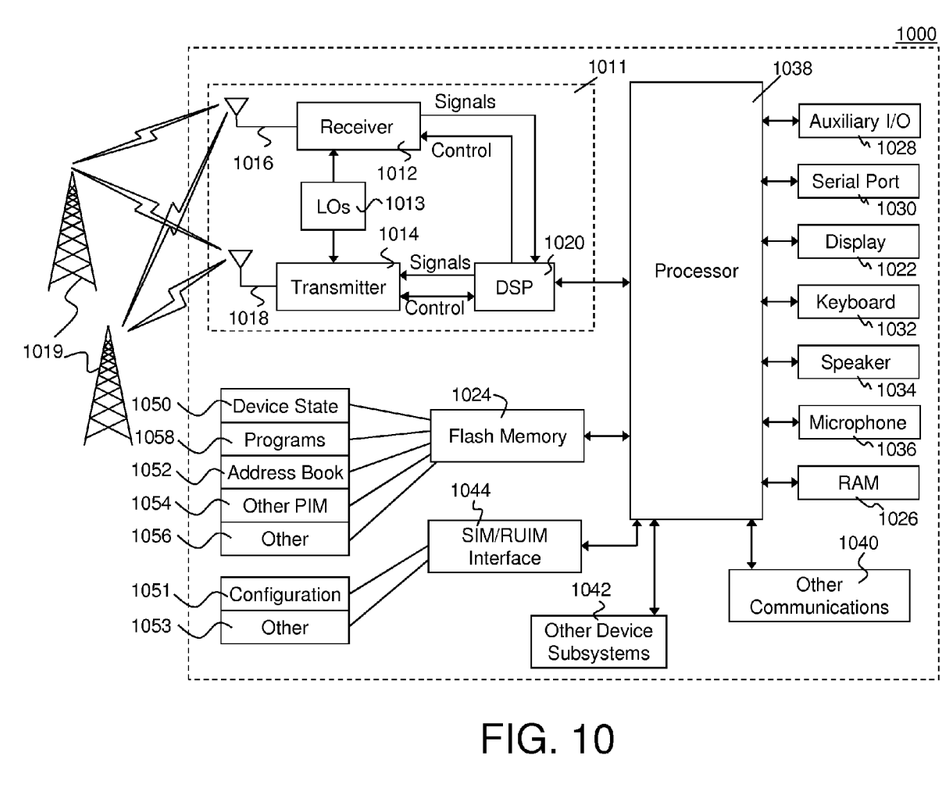
FIG. 10 is a block diagram of an exemplary user equipment.

UE 1000 is typically a two-way wireless communication device having voice and data communication capabilities. UE 1000 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1000 is enabled for two-way communication, it may incorporate a communication subsystem 1011, including a receiver 1012 and a transmitter 1014, as well as associated components such as one or more antenna elements 1016 and 1018, local oscillators (LOs) 1013, and a processing module such as a digital signal processor (DSP) 1020. As will be apparent to those skilled in the field of communications, the particular design of the communication subsystem 1011 will be dependent upon the communication network in which the device is intended to operate.

Network access requirements will also vary depending upon the type of network 1019. In some networks network access is associated with a subscriber or user of UE 1000. A UE may require a removable user identity module (RUIM) or a subscriber identity module (SIM) card in order to operate on a network. The SIM/RUIM interface 1044 is normally similar to a card-slot into which a SIM/RUIM card can be inserted and ejected. The SIM/RUIM card can have memory and hold many key configurations 1051, and other information 1053 such as identification, and subscriber related information.

When required network registration or activation procedures have been completed, UE 1000 may send and receive communication signals over the network 1019. As illustrated in FIG. 10, network 1019 can consist of multiple base stations communicating with the UE.

Signals received by antenna 1016 through communication network 1019 are input to receiver 1012, which may perform such common receiver functions as signal amplification, frequency down conversion, filtering, channel selection and the like. Analog to digital (A/D) conversion of a received signal allows more complex communication functions such as demodulation and decoding to be performed in the DSP 1020. In a similar manner, signals to be transmitted are processed, including modulation and encoding for example, by DSP 1020 and input to transmitter 1014 for digital to analog (D/A) conversion, frequency up conversion, filtering, amplification and transmission over the communication network 1019 via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

UE 1000 generally includes a processor 1038 which controls the overall operation of the device. Communication functions, including data and voice communications, are performed through communication subsystem 1011. Processor 1038 also interacts with further device subsystems such as the display 1022, flash memory 1024, random access memory (RAM) 1026, auxiliary input/output (I/O) subsystems 1028, serial port 1030, one or more keyboards or keypads 1032, speaker 1034, microphone 1036, other communication subsystem 1040 such as a short-range communications subsystem and any other device subsystems generally designated as 1042. Serial port 1030 could include a USB port or other port known to those in the art.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list.

Operating system software used by the processor 1038 may be stored in a persistent store such as flash memory 1024, which may instead be a read-only memory (ROM) or similar storage element (not shown). Those skilled in the art will appreciate that the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. Processor 1038, in addition to its operating system functions, may enable execution of software applications on the UE. A predetermined set of applications that control basic operations, including at least data and voice communication applications for example, will normally be installed on UE 1000 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 1019. Further applications may also be loaded onto the UE 1000 through the network 1019, an auxiliary I/O subsystem 1028, serial port 1030, short-range communications subsystem 1040 or any other suitable subsystem 1042, and installed by a user in the RAM 1026 or a non-volatile store (not shown) for execution by the processor 1038. Such flexibility in application installation increases the functionality of the device and may provide enhanced on-device functions, communication-related functions, or both. For example, secure communication applications may enable electronic commerce functions and other such financial transactions to be performed using the UE 1000.

In a data communication mode, a received signal such as a text message or web page download will be processed by the communication subsystem 1011 and input to the processor 1038, which may further process the received signal for output to the display 1022, or alternatively to an auxiliary I/O device 1028.

A user of UE 1000 may also compose data items such as email messages for example, using the keyboard 1032, which may be a complete alphanumeric keyboard or telephone-type keypad, among others, in conjunction with the display 1022 and possibly an auxiliary I/O device 1028. Such composed items may then be transmitted over a communication network through the communication subsystem 1011.

For voice communications, overall operation of UE 1000 is similar, except that received signals may typically be output to a speaker 1034 and signals for transmission may be generated by a microphone 1036. Alternative voice or audio I/O subsystems, such as a voice message recording subsystem, may also be implemented on UE 1000. Although voice or audio signal output is preferably accomplished primarily through the speaker 1034, display 1022 may also be used to provide an indication of the identity of a calling party, the duration of a voice call, or other voice call related information for example.

Serial port 1030 in FIG. 10 may normally be implemented in a personal digital assistant (PDA)-type UE for which synchronization with a user's desktop computer (not shown) may be desirable, but is an optional device component. Such a port 1030 may enable a user to set preferences through an external device or software application and may extend the capabilities of UE 1000 by providing for information or software downloads to UE 1000 other than through a wireless communication network. The alternate download path may for example be used to load an encryption key onto the device through a direct and thus reliable and trusted connection to thereby enable secure device communication. As will be appreciated by those skilled in the art, serial port 1030 can further be used to connect the UE to a computer to act as a modem.

Other communications subsystems 1040, such as a short-range communications subsystem, is a further optional component which may provide for communication between UE 1000 and different systems or devices, which need not necessarily be similar devices. For example, the subsystem 1040 may include an infrared device and associated circuits and components or a Bluetooth™ communication module to provide for communication with similarly enabled systems and devices. Subsystem 1040 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a network node for obtaining spectrum sensing information, the method comprising:
   communicating to at least one of a user equipment or a sensing node at least one event condition for spectrum sensing;
   providing to the at least one of the user equipment or the sensing node channel descriptors for reporting; and
   receiving a report from the at least one of the user equipment or the sensing node utilizing the channel descriptors, the report indicating the at least one event condition has been met to facilitate event triggered spectrum sensing and comprising sensing information measured by the at least one of the user equipment or the sensing node;

wherein the at least one event condition is selected from event conditions comprising at least one of:

the at least one of the user equipment or the sensing node is within a distance threshold of a specified location;

the at least one of the user equipment or the sensing node receives a signal having a signal strength over a signal strength threshold; or the at least one of the user equipment or the sensing node determines that a specified channel is available.

2. The method of claim 1, wherein at least one of the communicating or providing is done over a broadcast or multicast channel.

3. The method of claim 2, wherein at least one of the communicating or providing utilizes encrypted information with a key known only to intended user equipment or sensing nodes.

4. The method of claim 1, wherein the channel descriptors include a spreading code assigned for the reporting.

5. The method of claim 1, further comprising validating the report.

6. The method of claim 5, wherein the validating utilizes a weighting based on signal strength of the report.

7. The method of claim 1, further comprising ending reporting from the at least one of the user equipment or the sensing node.

8. The method of claim 1, further comprising sending a report to a spectrum manager.

9. The method of claim 1, further comprising receiving a request for spectrum sensing from a spectrum manager.

10. The method of claim 1, wherein the user equipment is in idle mode and is requested to send sensing report.

11. The method of claim 10, wherein the request is based on insufficient sensing statistics from user equipments or sensing nodes in an active mode.

12. A method at a spectrum manager comprising:

communicating to at least one network node at least one event condition for spectrum sensing; and receiving a report from the at least one network node concerning event conditions being met such that event triggered spectrum sensing is facilitated and comprising sensing information measured by the at least one network node;

wherein the at least one event condition is selected from event conditions comprising at least one of:

the at least one network node is within a distance threshold of a specified location;

the at least one network node receives a signal having a signal strength over a signal strength threshold; or the at least one network node determines that a specified channel is available.

13. The method of claim 12, wherein the report is a compilation of statistics at the network node.

14. The method of claim 13, wherein the report is a histogram.

15. The method of claim 12, wherein the report is raw data.

16. The method of claim 12, further comprising validating the report.

17. The method of claim 16, wherein the validating is performed by utilizing a weighting based on a number of user equipments and sensing nodes captured within the report.

18. A method at a user equipment or a sensing node comprising:

receiving both at least one event condition for spectrum sensing and channel descriptors for reporting; and if the at least one event condition is met:

measuring sensing information;

sending a report to a serving network node utilizing the channel descriptors if the at least one event condition has been met such that event triggered spectrum sensing is facilitated and comprising the measured sensing information wherein the at least one event condition is selected from event conditions comprising at least one of:

the user equipment or the sensing node is within a distance threshold of a specified location;

the user equipment or the sensing node receives a signal having a signal strength over a signal strength threshold; or the user equipment or the sensing node determines that a specified channel is available.

19. The method of claim 18, wherein the receiving is done over a broadcast or multicast channel.

20. The method of claim 19, wherein the at least one of the event conditions or channel descriptors are encrypted.

21. The method of claim 18, wherein the channel descriptors include a spreading code assigned for the reporting.

22. The method of claim 18, wherein the transmit power of the sensing report is determined based on a proximity of the user equipment or sensing node to a location specified in the event condition.

23. The method of claim 22, wherein the transmit power is determined based on a target signal to interference noise ratio ('SINR') or a received power at the serving node.

24. A non-transitory computer-readable medium having instructions stored thereon for execution by a processor, the instructions comprising code for:

communicating to at least one of a user equipment or a sensing node at least one event condition for spectrum sensing;

providing to the at least one of the user equipment or the sensing node channel descriptors for reporting; and receiving a report from the at least one of the user equipment or the sensing node utilizing the channel descriptors, the report indicating the at least one event condition has been met to facilitate event triggered spectrum sensing and comprising sensing information measured by the at least one of the user equipment or the sensing node;

wherein the at least one event condition is selected from event conditions comprising at least one of:

the at least one of the user equipment or the sensing node is within a distance threshold of a specified location;

the at least one of the user equipment or the sensing node receives a signal having a signal strength over a signal strength threshold; or the at least one of the user equipment or the sensing node determines that a specified channel is available.

25. A non-transitory computer-readable medium having instructions stored thereon for execution by a processor, the instructions comprising code for:

communicating to at least one network node at least one event condition for spectrum sensing; and receiving a report from the at least one network node concerning event conditions being met such that event triggered spectrum sensing is facilitated and comprising sensing information measured by the at least one network node;

wherein the at least one event condition is selected from event conditions comprising at least one of:

the at least one network node is within a distance threshold of a specified location;

the at least one network node receives a signal having a signal strength over a signal strength threshold; or the at least one network node determines that a specified channel is available.

26. A non-transitory computer-readable medium having instructions stored thereon for execution by a processor of a user equipment or a sensing node, the instructions comprising code for:

receiving both at least one event condition for spectrum sensing and channel descriptors for reporting; and if the at least one event condition is met:
measuring sensing information;
sending a report to a serving network node utilizing the channel descriptors if the at least one event condition has been met such that event triggered spectrum sensing is facilitated and comprising the measured sensing information;

wherein the at least one event condition is selected from event conditions comprising at least one of:

the user equipment or the sensing node is within a threshold distance of a specified location;

the user equipment or the sensing node receives a signal having a signal strength over a signal strength threshold; or the user equipment or the sensing node determines that a specified channel is available.

* * * * *